Jan. 8, 1929.  1,698,181
C. ANDRADE, JR
DIFFERENTIAL
Filed Sept. 20, 1926  4 Sheets-Sheet 4
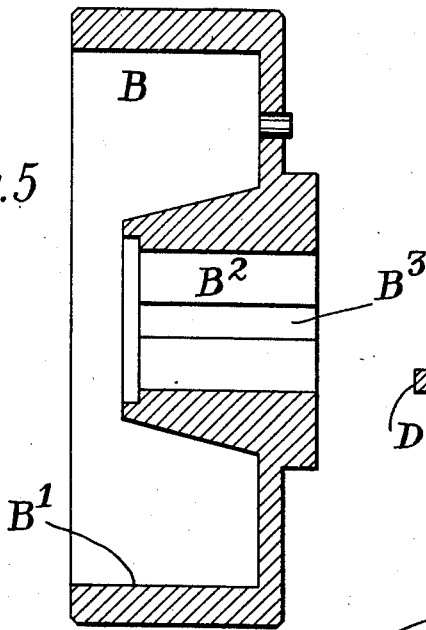
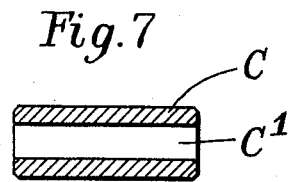
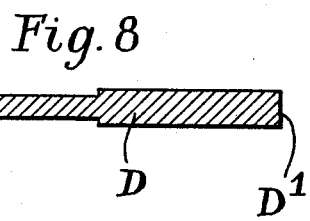
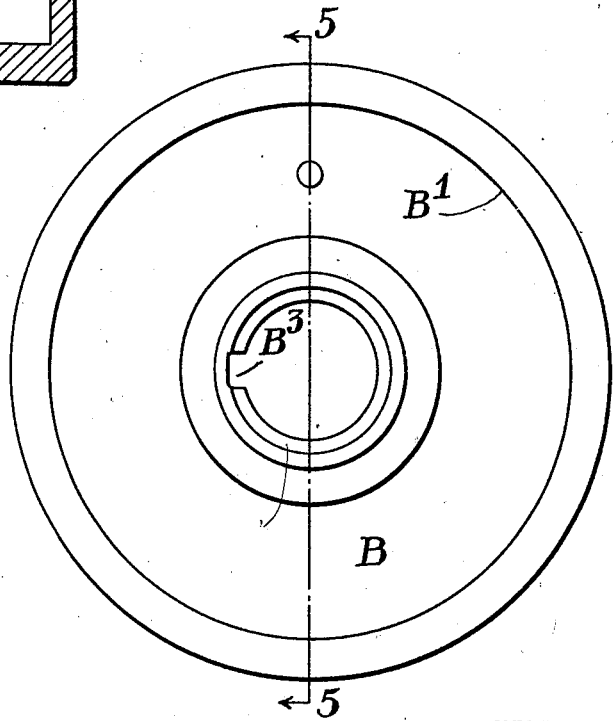
INVENTOR.
Cipriano Andrade Jr.

Patented Jan. 8, 1929.

1,698,181

UNITED STATES PATENT OFFICE.

CIPRIANO ANDRADE, JR., OF NEW YORK, N. Y.

DIFFERENTIAL.

Application filed September 20, 1926. Serial No. 136,486.

My invention relates to differentials; and the object of my invention is to create a locking differential of simpler construction and more efficient function than those heretofore in use.

Figure 1:
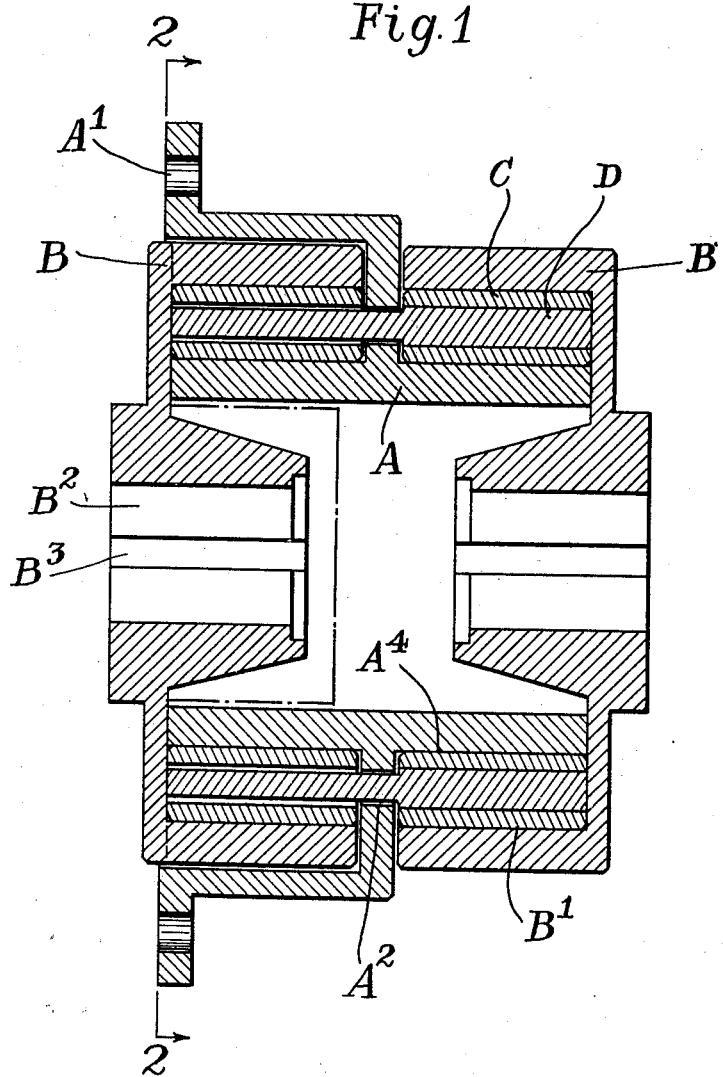
Figure 2:
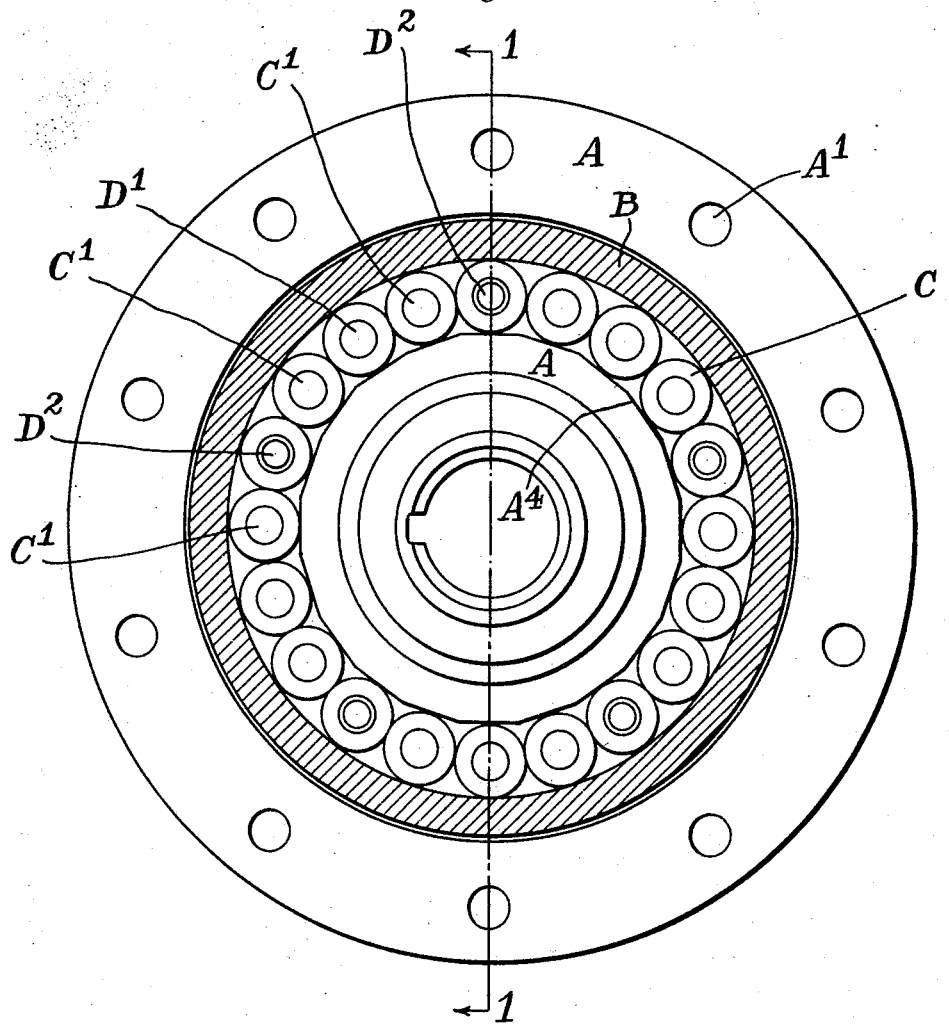
Figure 3:
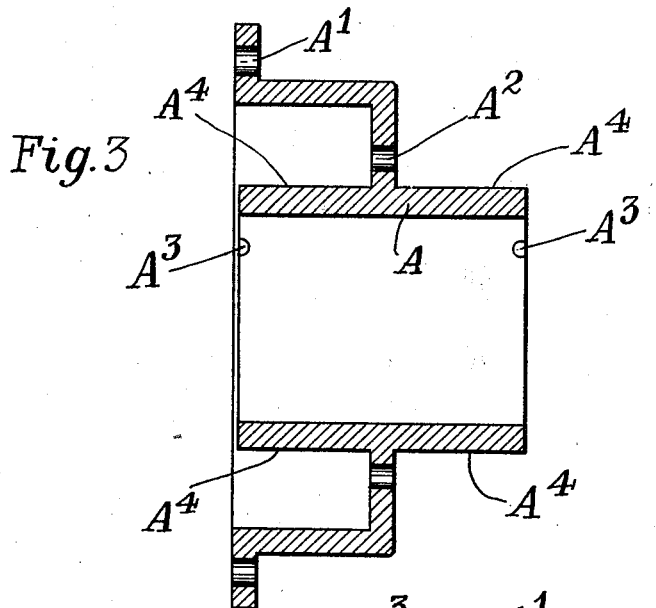
Figure 4:
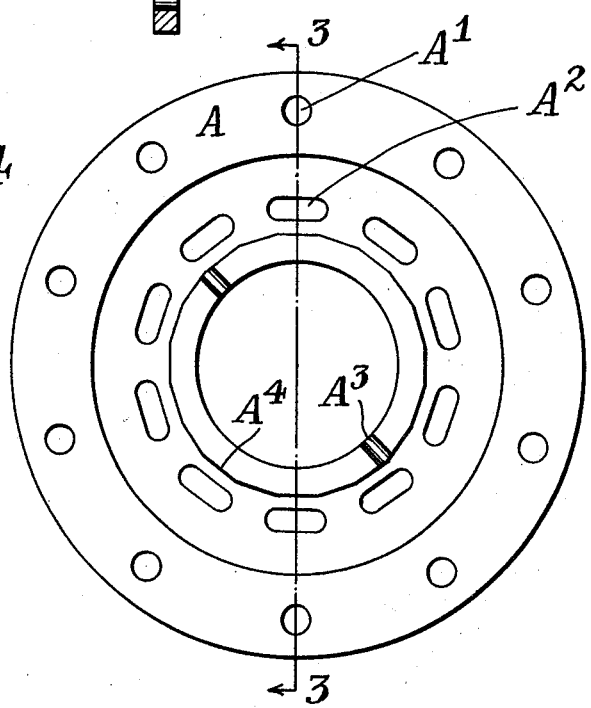

I attain these objects by the mechanism illustrated in the accompanying drawings, in which:

Fig. 1 is a sectional side view of my device on section 1—1 of Fig. 2; Fig. 2 is an end view of my device with a portion thereof cut off in section as shown on the sections 2—2 of Fig. 1, that portion being drawn in sectional form in Fig. 2; Fig. 3 in a sectional side view in reduced size from Figs. 1 and 2 of my driving member A on section 3—3 of Fig. 4; Fig. 4 in an end view in reduced size from Figs. 1 and 2 of my driving member A; Fig. 5 is a sectional side view of one of my driven members B on section 5—5 of Fig. 6; Fig. 6 is an end view of one of my driven members B; Fig. 7 is a sectional side view of one of my rollers C; and Fig. 8 is a sectional side view of one of my control rods D.

Similar letters and numerals refer to similar parts throughout the several views:

A is the driving member; $A^1$ are the bolt holes to hold the bolts which fasten the master gear to the driving member A; $A^2$ are openings in driving member A which allow the control rods D to move to a limited degree horizontally with the rollers C from one locking position to the opposite locking position; $A^3$ are grease channels on the ends of driving member A; $A^4$ are flat locking surfaces on each end of driving member A; B are the two driven members; $B^1$ is the inner circular locking surface of the driven member B; $B^2$ is the opening in driven member B to admit the axle end; $B^3$ is the keyway to hold the key for the axle end; C are the rollers; $C^1$ are the longitudinal spaces inside of rollers C; D are the control rods; $D^1$ is the large end of the control rod D which preferably fits closely into the space $C^1$ of roller C; and $D^2$ is the small end of the control rod D which permits a limited horizontal motion of the roller which is over said small end $D^2$.

It will be understood that instead of having absolutely flat locking surfaces $A^4$, a slight curve either inward or outward could be used, or any other form of surface which would cause the rollers to lock either in forward or reverse against the inner face $B^1$. In like manner the control rod D might be made with its large end $D^1$ integral with a solid roller and with its small end $D^2$ fitting into a roller with an opening larger than said $D^2$, as fully disclosed in my issued Patent No. 1,505,124 and therein referred to as a lug, but herein referred to as a control rod both in the specification and claims. Also instead of the hollow rollers marked $C^1$ in Fig. 2, these rollers could be solid rollers, as they are not connected with each other by control rods. As explained in my Patent 1,505,124, one single lug, which functions the same as the control rod, will give the necessary differential functions. Also if desired, instead of the twenty rollers in each set as shown in Fig. 2, a set of ten rollers or any desired number of rollers in contact with each other could be used, and in that case it might be mechanically possible to have so few openings $A^2$, that each roller could carry a control rod.

It will be understood that when my present device is installed in a rear axle housing the usual roller bearings or other similar devices on the outside of the differential, and inside of the rear axle housing will keep this differential in assembly, so that the two driven members B cannot work too far apart.

The operation of my device is as follows:

The differential functioning of the rollers and control rods is fully described in my issued Patents Nos. 1,471,642; 1,505,124 and 1,505,687; and it will be observed that in all three of said issued patents the driving member with its eccentric locking arcs are outside of the rollers; and with these three forms which have the driving member with its eccentric locking arcs outside of the rollers by a large number of road tests in cars and trucks it has been found that when the car or truck is running down a hill with the clutch out, or is running at speed on a level road and the clutch is thrown out, the centrifugal throw of the rollers caused by the rapid rotation of the differential forces the rollers into the centres of the eccentric arcs of the driving member. These arcs are shown in Fig. 2 of my Patent 1,505,124. And when the rollers are in this position when the clutch is thrown in, and the driving member starts to rotate at a different speed from the driven members, the rollers remain in the centres of the arcs for some appreciable time before they happen to touch the cylindrical inner driven member and become locked. This produces more or less of a backlash or slip.

But in my present device, the locking surface $A^4$ of the driving member A instead of being outside of the rollers as in my cited patents, is now inside of the rollers C. And in my present device, the locking surface B¹ of the driven members B instead of being inside of the rollers as in my cited patents, is now outside of the rollers C. The result is that with my present device, when the car or truck is running down a hill with the clutch out, or is running at speed on a level road and the clutch is thrown out, the centrifugal throw of the rollers C can merely force them against the inner cylindrical surface B¹ of the driven members B, and the instant that the driving member A starts to rotate at a different speed from the driven members B, and the locking surfaces A⁴ of the driving member A create instantaneous locking of the rollers C, against the inner cylindrical locking surface B¹ of the driven members B, thus completely eliminating any backlash or slip.

When the rollers C as shown in Fig. 2 hereof are in neutral position at the centre of each locking surface A⁴, there is a small radial clearance of a few thousandths of an inch on the surfaces of the rollers C between the locking surfaces A⁴ of the driving member A and the locking surface B¹ of the driven member B. And while in this neutral position as shown in Fig. 2, if the driving member A starts to rotate clockwise faster than the driven members B, the rollers C will become locked at a point somewhere on the locking surface A⁴ between the neutral centre of said surface A⁴ and the left hand end of said locking surface A⁴, as it will be noted that the ends of the locking surface A⁴ are radially less distant from the cylindrical locking surface B¹ than the diameter of the rollers C. Likewise while the rollers C are in the neutral position as shown in Fig. 2 hereof, if the driving member A starts to rotate anticlockwise faster than the driven members B, the rollers C will become locked at a point somewhere on the locking surface A⁴ between the neutral centre of said locking surface A⁴ and the right hand end of said locking surface A⁴. And in either position, the rollers C will all lock simultaneously, owing to the practical contact sidewise of each roller against the other as shown in Fig. 2, whereby all the rollers must move circumferentially together.

Having thus described both the forward and reverse locking function of the rollers C, I will now describe the differential function of said device. It will be noted by reference to Fig. 1, that there are two sets of rollers C, one of said sets of rollers C being under the right hand driven member B, and the other set of rollers C being under the left hand driven member B. And as shown in Fig. 1, it will be further observed that the right hand rollers C are connected with the left hand rollers C by the control rods D; the large end D¹ of said control rods D being closely fitted inside of the right hand rollers C, and the small end D² (see Fig. 8 hereof) of said control rods D having a small clearance space inside of the left hand rollers C. As shown also in Fig. 2, the large ends D¹ of the control rods are placed alternately, some of said large ends D¹ being in the right hand rollers C, and some of said large ends D¹ being in the left hand rollers C. By reference to the reduced size Figs. 3 and 4 showing the driving member A by itself, and, as shown also in Fig. 1, it will be noted that the openings A² permit the control rods D to move to a limited degree horizontally with the rollers C from one locking position of the rollers C on locking surface A⁴ to the opposite locking position of the rollers C on locking surface A⁴. In Fig. 2 as shown, it will be noted that the left hand set of rollers C therein are in neutral central position on the flat locking surfaces A⁴ of driving member A; and also by observing that the small ends D² of control rods D are in the centre of space C¹ of said left hand rollers C, it is therefore clear that the right hand set of rollers C, which are behind the left hand set of rollers C, are also in neutral central position on the flat locking surfaces A⁴ of driving member A. Let us now assume that in Fig. 2, the driving member A starts to rotate clockwise more rapidly than the two driven members B; as a result thereof, as previously shown herein, both the left hand set of rollers C and the right hand set of rollers C will thereupon lock at a point somewhere on the locking surface A⁴ between the neutral centre of said locking surface A⁴ and the left hand end of said locking surface A⁴. And when both said sets of rollers C are in this locking position, if the left hand driven member B shown on Fig. 1 and Fig. 2, should now start to rotate clockwise faster than driving member A, said motion will move the left hand set of rollers C clockwise from their locking position on the left hand portion of the flat locking surface A⁴ of driving member A, until said left hand set of rollers C are held by the control rods D, which said control rods D are held by the right hand set of locked rollers C from further motion; and when thus held by control rods D, said left hand set of rollers C, being at or near the neutral centre of the locking surface A⁴, will permit said left hand driven member B to rotate freely for any length of time clockwise faster than driving member A. This is the usual function in turning a corner in an automobile, wherein the outside rear wheel rotates more rapidly than the inside rear wheel. The differential function just described will operate on either driven member either forward or reverse. The physical appearance of said two sets of rollers governed by the control rods while under differential function as just described herein, can be seen in Fig. 3 of my issued Patent No. 1,505,124, previously mentioned herein.

From the foregoing facts it will be observed that to secure proper mechanical action of the control rods D under the various differential functions it becomes necessary to make the lengthened longitudinal open spaces $A^2$ in the driving member A as shown in Fig. 4 hereof, because at different times the rollers C are locked either at the right hand half or the left hand half of the locking surface $A^4$, shown on Fig. 2 hereof, and as the rollers C make this limited sideway motion, the control rods D, being carried by the rollers C, have a similar limited sideway motion.

A further advantage of my device as disclosed in Fig. 1 resides in the fact that when its master gear, not shown herein but well known in the art, is being driven by the drive gear on the automobile drive shaft, not shown herein but well known in the art, at least one of the locking surfaces $A^4$ of the driving member A of my device, even when in neutral position, at all times is thus forced into actual contact with at least one of the rollers C, which said roller is thus forced into actual contact with the locking surface $B^1$ of the driven member B. This result is caused by the side throw of the master gear by the drive gear, which tends to throw the driving member A out of its centrifugal position, and there is nothing but the rollers C which can hold said driving member A in centrifugal position. And this actual contact of said rollers C with the locking surfaces $A^4$ and $B^1$ will eliminate any possible backlash.

I claim:

1. In a differential; a first set of locking rollers; a second set of locking rollers; a control rod which connects one of the rollers in said first set of locking rollers with one of the rollers in said second set of locking rollers; a driving member with a first set of locking surfaces inside of the first set of locking rollers, and with a second set of locking surfaces inside of said second set of locking rollers, each one of said locking surfaces permitting one of the locking rollers to move only to a limited extent sideways thereon; a first driven member with its locking surface outside of said first set of locking rollers, said locking surface being on the inner face of said driven member; a second driven member with its locking surface outside of said second set of locking rollers, said locking surface being on the inner face of said driven member; a portion of said driving member which lies between the inner ends of the locking surfaces of the two driven members and also between the inner ends of the two sets of locking rollers; and an opening in said portion of the driving member, said opening being adapted to allow said control rod to move to a limited degree with the two opposite locking rollers from one locking position of the said locking rollers to the opposite locking position of the said locking rollers on the locking surfaces of said driving member.

2. In a differential; a first set of locking rollers in contact with each other; a second set of locking rollers in contact with each other; a control rod which connects one of the rollers in said first set of locking rollers with one of the rollers in said second set of locking rollers; a driving member with a first set of locking surfaces inside of the first set of locking rollers, and with a second set of locking surfaces inside of said second set of locking rollers, each one of said locking surfaces permitting one of the locking rollers to move only to a limited extent sideways thereon; a first driven member with its locking surface outside of said first set of locking rollers, said locking surface being on the inner face of said driven member; a second driven member with its locking surface outside of said second set of locking rollers, said locking surface being on the inner face of said driven member; a portion of said driving member which lies between the inner ends of the locking surfaces of the two driven members and also between the inner ends of the two sets of locking rollers; and an opening in said portion of the driving member, said opening being adapted to allow said control rod to move to a limited degree with the two opposite locking rollers from one locking position of the said locking rollers to the opposite locking position of the said locking rollers on the locking surfaces of said driving member.

3. In a differential; a first set of locking rollers in contact with each other; a second set of locking rollers in contact with each other; a driving member with its locking surfaces inside of said rollers, said driving member being free for radial movement; a first driven member with its locking surface outside of said first set of locking rollers; and a second driven member with its locking surface outside of said second set of locking rollers.

4. In a differential; a first set of locking rollers; a second set of locking rollers; a driving member with its locking surfaces inside of said rollers; a first driven member with its locking surface outside of said first set of locking rollers; and a second driven member with its locking surface outside of said second set of locking rollers; said driving member being free for radial movement except by actual pressure contact of one or more of said rollers against said driving member and against one or both of said driven members.

CIPRIANO ANDRADE, Jr.